H. J. FEREDAY.
TRAVELING APPARATUS.
APPLICATION FILED MAY 26, 1917.

1,318,318.

Patented Oct. 7, 1919.
7 SHEETS—SHEET 1.

INVENTOR
HARRY J. FEREDAY
BY Howson and Howson
ATTORNEYS

H. J. FEREDAY.
TRAVELING APPARATUS.
APPLICATION FILED MAY 26, 1917.

1,318,318.

Patented Oct. 7, 1919.
7 SHEETS—SHEET 2.

INVENTOR
HARRY J. FEREDAY
BY Howson and Howson
ATTORNEYS

H. J. FEREDAY.
TRAVELING APPARATUS.
APPLICATION FILED MAY 26, 1917.

1,318,318.

Patented Oct. 7, 1919.

7 SHEETS—SHEET 3.

INVENTOR
HARRY J. FEREDAY
BY Howson and Howson
ATTORNEYS

H. J. FEREDAY.
TRAVELING APPARATUS.
APPLICATION FILED MAY 26, 1917.
1,318,318.                                Patented Oct. 7, 1919.
7 SHEETS—SHEET 4.
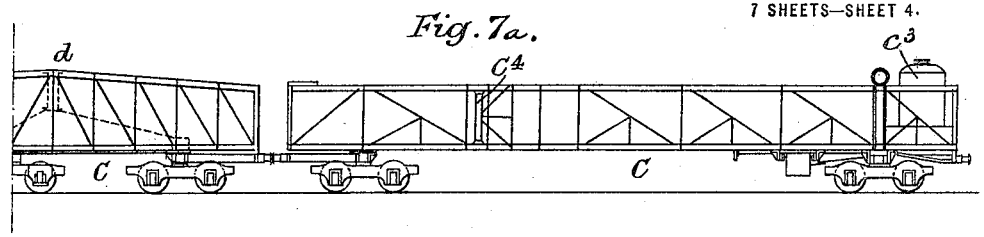
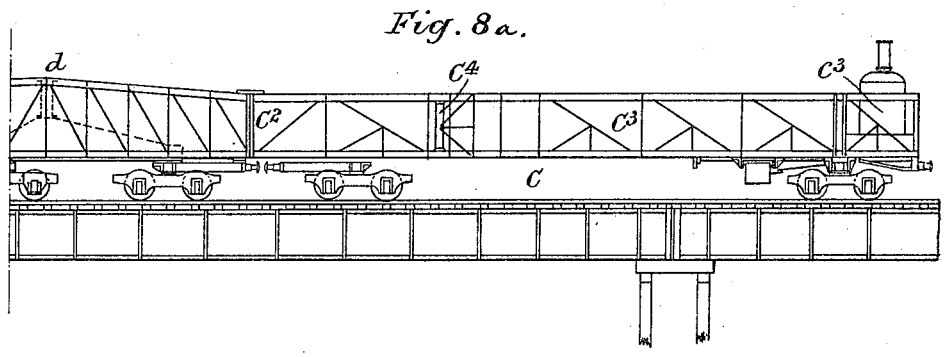
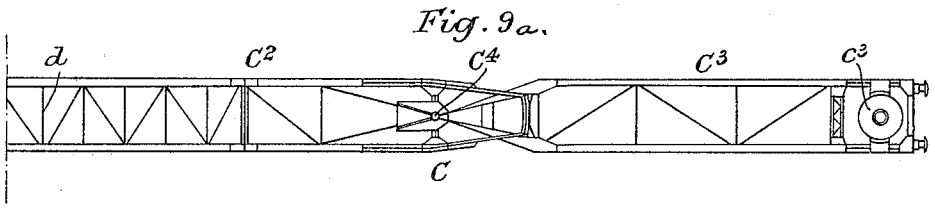
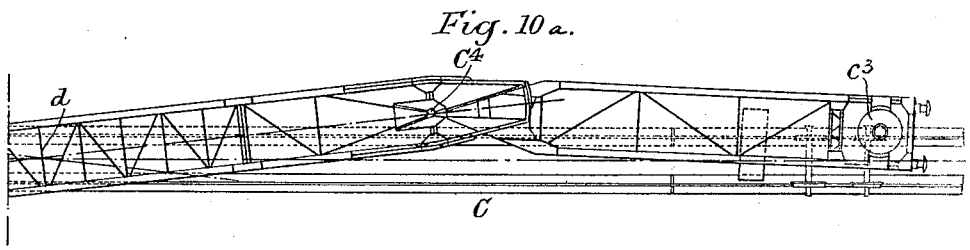
INVENTOR
HARRY J. FEREDAY
BY
ATTORNEYS

H. J. FEREDAY.
TRAVELING APPARATUS.
APPLICATION FILED MAY 26, 1917.

1,318,318.

Patented Oct. 7, 1919.
7 SHEETS—SHEET 5.

INVENTOR
HARRY JOHN FEREDAY
BY *Henson and Henson*
ATTORNEYS

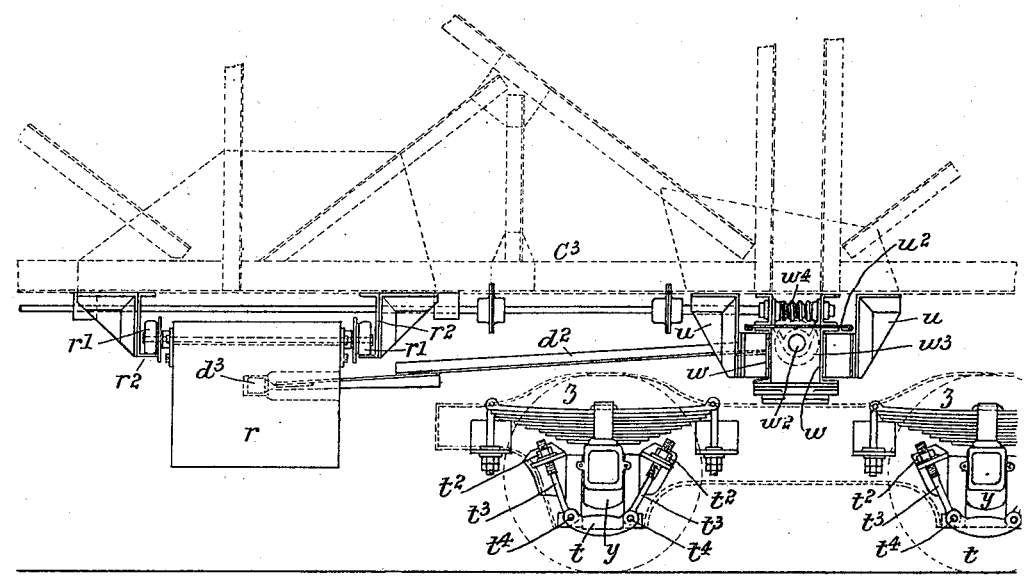
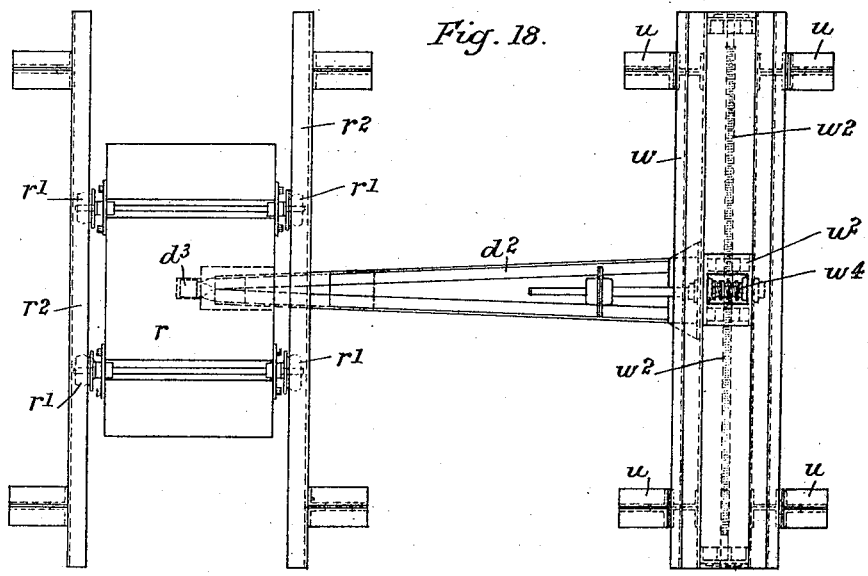

UNITED STATES PATENT OFFICE.

HARRY JOHN FEREDAY, OF UPPER TOOTING, LONDON, ENGLAND.

TRAVELING APPARATUS.

1,318,318.     Specification of Letters Patent.     Patented Oct. 7, 1919.

Application filed May 26, 1917. Serial No. 171,334.

*To all whom it may concern:*

Be it known that I, HARRY JOHN FEREDAY, a subject of the King of Great Britain, residing at 22 Huron road, Upper Tooting, in the county of London, England, have invented new and useful Improvements in Traveling Apparatus, of which the following is a specification.

The object of this invention is to provide improved apparatus for use in pile-driving, applicable also to analogous apparatus in cases where the structure, constituting the body of the apparatus, is of considerable length and is to be capable of traveling upon the permanent way of railways when so desired although it can of course be taken over any suitable track, or roadway, the wheels of the bogies being, if necessary, adapted for the purpose. The apparatus may, for example, be such as is to be used for rock-breaking, tamping light dredging, track-laying, bridge repairing, painting, and other analogous operations, or purposes, where a long structure, such as is hereinafter described, can be employed with advantage. As the invention is more especially applicable to pile-driving apparatus I will describe it as so applied and from this description its analogous applications will also be readily understood.

Figure 1:
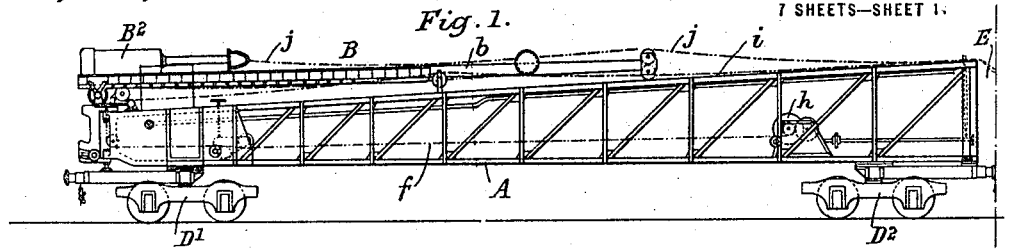
Figure 4:
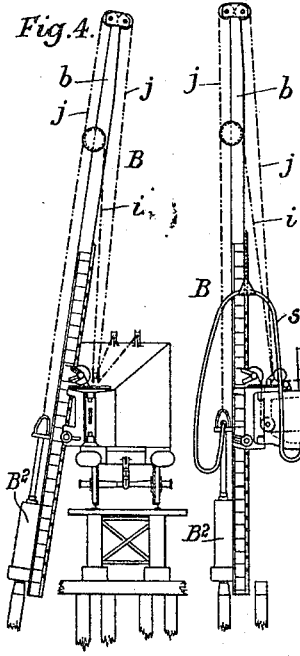
Figure 2:
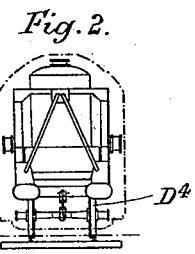
Figure 3:
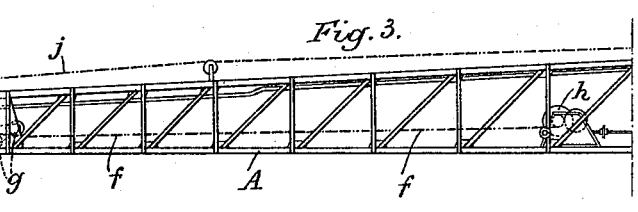
Figure 5:
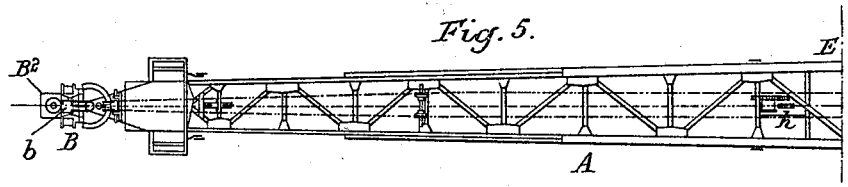
Figure 6:
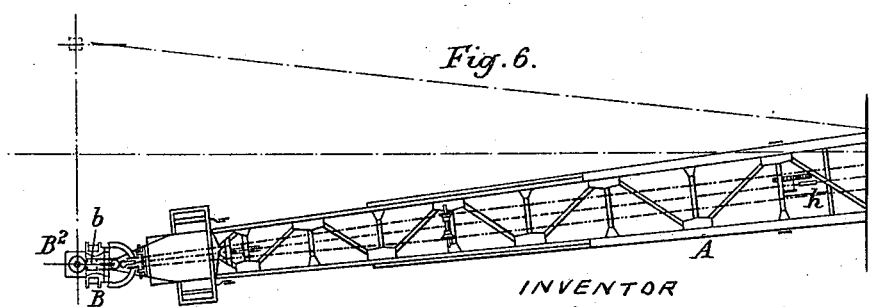
Figure 1A:
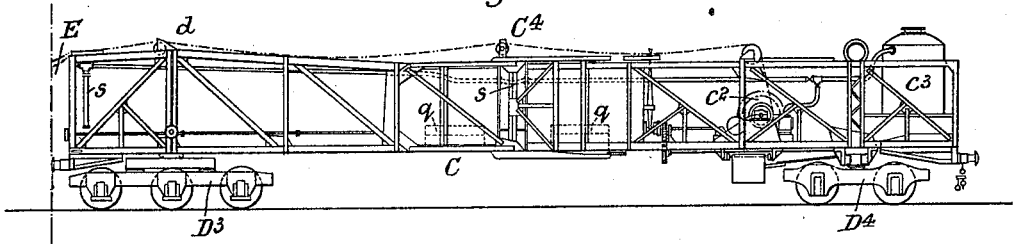
Figure 3A:
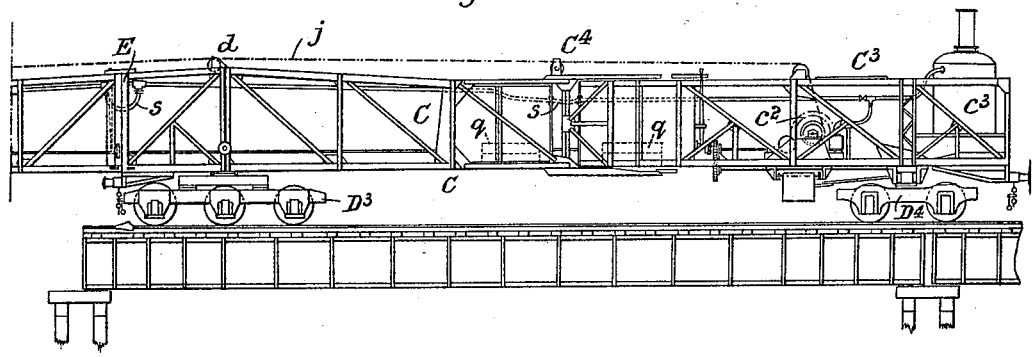
Figure 5A:
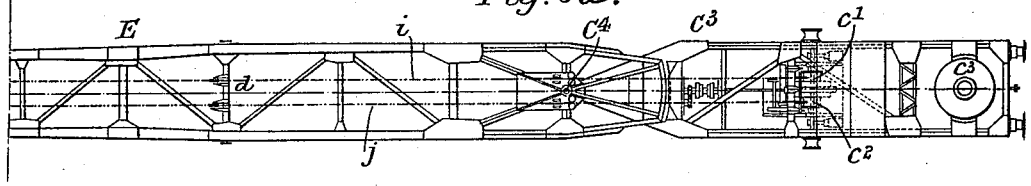
Figure 6A:
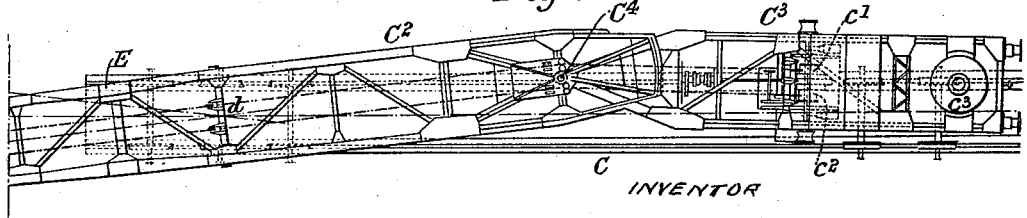
Figure 7:
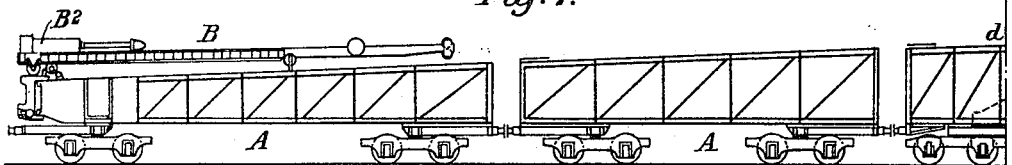
Figure 8:
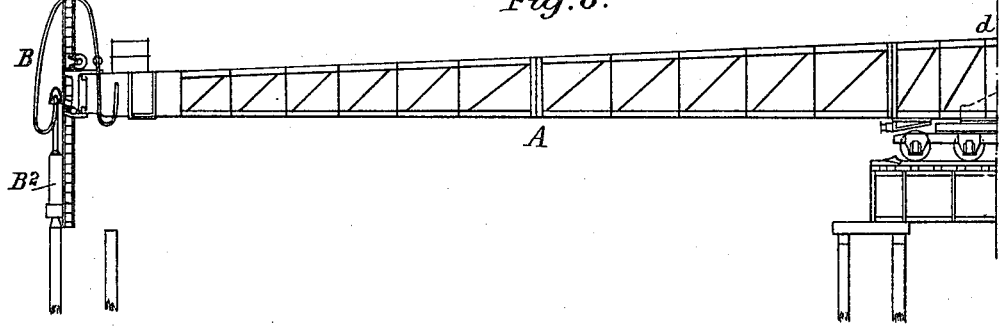
Figure 9:
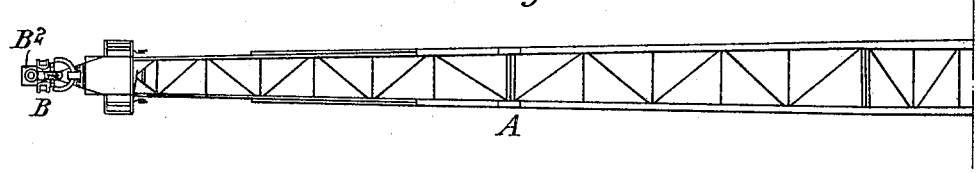
Figure 10:
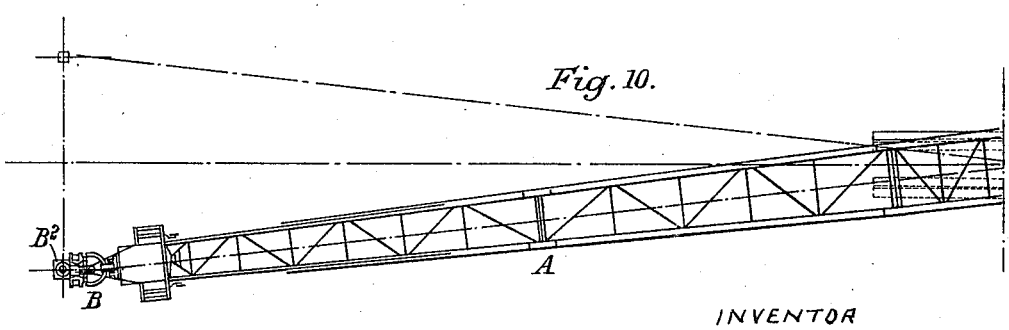
Figure 11:
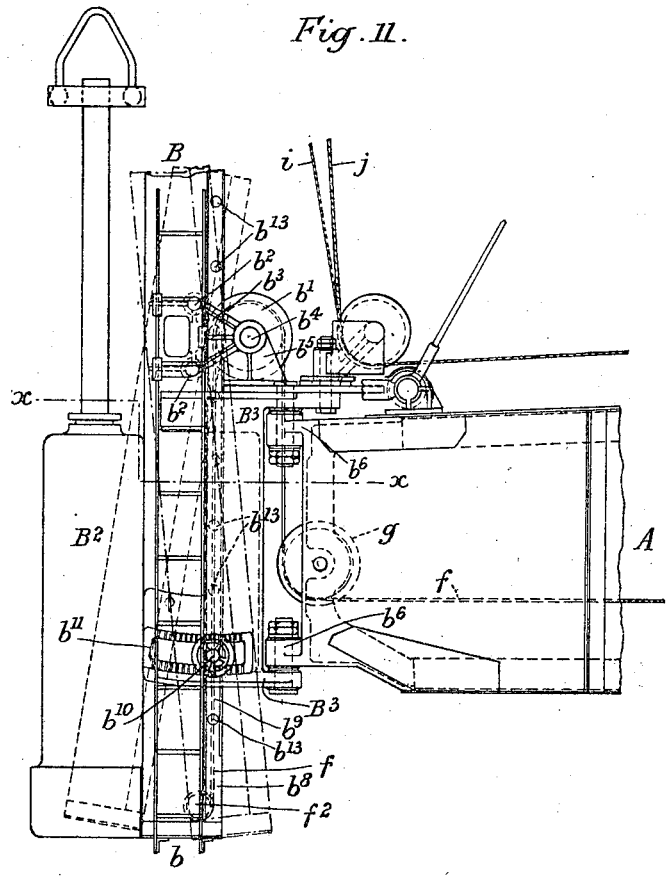
Figure 12:
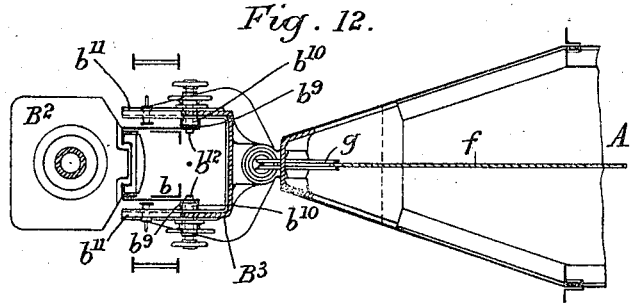
Figure 13:
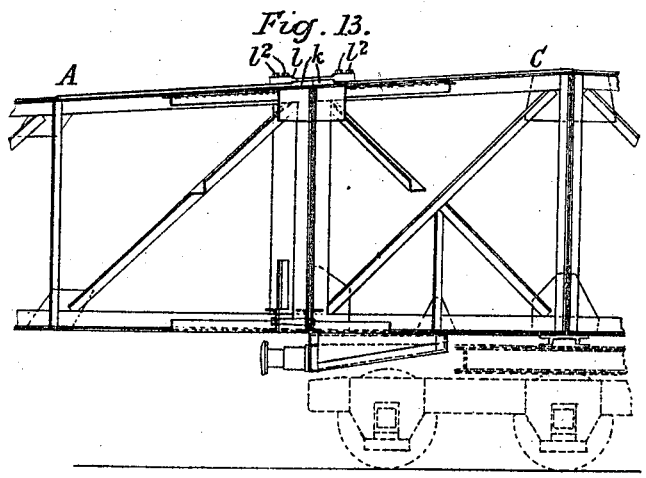
Figure 14:
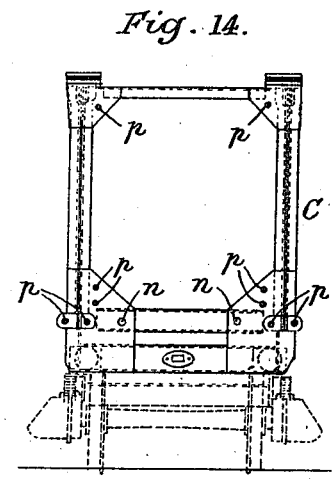
Figure 15:
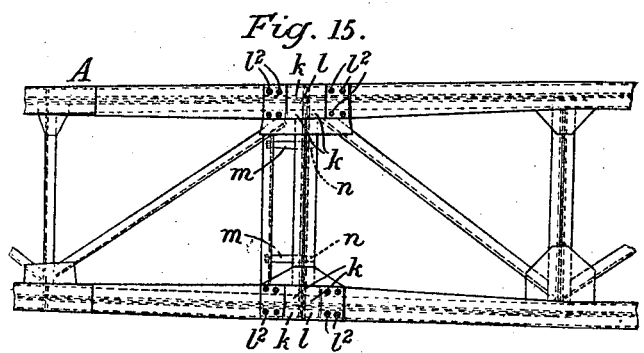
Figure 16:
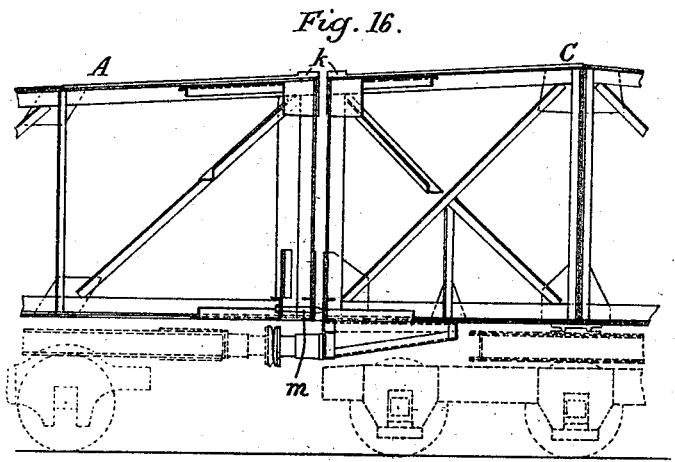

In describing this invention I will refer to the accompanying drawings in which Figures 1—1$^a$ combined constitute a side elevation of the apparatus in position for traveling upon a railway. Fig. 2 is a rear end view thereof. Figs. 3—3$^a$ combined constitute a side elevation of the apparatus in position for work. Fig. 4 is a front end elevation thereof. Figs. 5—5$^a$ combined constitute a plan of the same. Figs. 6—6$^a$ combined constitute a similar plan, showing the forward portion of the apparatus in a different position. Figs. 7—7$^a$ combined; 8—8$^a$ combined; 9—9$^a$ combined; 10—10$^a$ combined constitute views like Figs. 1—1$^a$, 3—3$^a$, 5—5$^a$, and 6—6$^a$, but in which the forward and rearward portion of the apparatus are each made in parts which are separated, each portion being carried upon bogies for traveling and joined together to form the forward and rearward portions for work. Figs. 11 to 18 show details drawn to a larger scale. Fig. 11 being a side elevation of the head, or nose-end, of the forward portion with the lower end of the mast, or leader, and jumper and Fig. 12 being a section on the line $x$—$x$ Fig. 11. Figs. 13 to 16 show the devices by means of which the forward and rearward portions can be connected together, the bogies in these figures being shown in dotted lines. Fig. 13 is a side elevation showing the ends of the portions joined. Fig. 14 is an elevation of the forward end of the rearward portion. Fig. 15 is a plan and Fig. 16 is an elevation like Fig. 13, but with the portions not joined together. Fig. 17 shows, in side elevation, the devices in connection with the hinder bogie of the rearward portion and Fig. 18 is a plan of parts thereof as hereinafter explained.

The structure as a whole consists of any suitable number of portions, lengthwise considered, which portions, when connected together, constitute the structure. These portions are each mounted on bogies. For the purpose of particular description I will presume that the structure is in two portions, (as shown in Figs. 1 to 6) one portion (the forward portion A) constituting, when the apparatus is in position for work, a cantaliver which carries at its head, or front-end, the pile-driving apparatus proper B. The other portion of the structure (the rearward portion C) may be regarded, by reason of its counter-balancing effect, as an anchorage portion for the cantaliver constituted by the forward portion A. The said rearward portion C, preferably carries, as illustrated, the whole power-generating and applying devices by which the various movements necessary for manipulation of the apparatus and for pile-driving are effected. The bogies on which the structure is mounted for traveling, on a railway for instance, are respectively marked $D^1$, $D^2$, $D^3$ and $D^4$.

The forward portion A, when the structure has been brought on the railway, or other track, to the place where it is to be used, can be raised on its bogies $D^1$ and $D^2$, relatively to the rearward portion, C, which raising may be effected by any suitable lifting appliances carried upon, or forming part of, the said bogies, and means are provided by which the opposed ends of the two portions A and C of the structure, when they meet in correct position, can be secured rigidly together at E.

I do not limit myself to precise details, but I may describe the following as devised for the special purposes of this invention.

The device by which the actual pile-driving is effected is carried by a mast or leader, $b$, which, for traveling purposes, can be lowered onto the top of the forward portion, A, as shown in Fig. 1, the lower, or forward, end of this mast, or leader, carrying the jumper, $B^2$ and being capable of sliding between rollers $b^2$, $b^2$, (see Fig. 11), carried by brackets $b^3$, capable of turning upon the center $b^4$, carried by the brackets $b^5$, secured to the end casting $B^3$, which can turn upon centers $b^6$, upon the forward end of the portion A. The center $b^4$, carries the pulley $b^1$, which acts as one of the guides for the mast, or leader, $b$ the lower end of the said mast, or leader, having connected to it, at $f^2$, one end of a rope, or chain, $f$, which passes over the pulley $b^1$ and then is guided by the pulleys, $g$, and, at its other end, it is connected with a winch $h$, by which the rope, or chain, $f$, can be manipulated in conjunction with the rope, or chain, $j$ hereinafter referred to, to allow of the mast and pile-driving appliances proper being brought into the position for traveling as shown in Fig. 1, or of taking their working positions after the mast, or leader, $b$, has been pushed forward, the weight of its overhanging part and the attached jumper $B^2$, then causing it to turn upon the center $b^4$, and assume a vertical, or approximately vertical, position and, when it is afterward hauled up by the winch, a gap $b^8$, formed by cutting away the flanges in each of the channels $b^9$ of the said mast, or leader, $b$, comes opposite to a retaining device on the casting $B^3$ at the head, or nose end, of the forward portion A, of the structure, by which retaining device the mast, or leader $b$, after it has been somewhat lowered, is secured in position for work. The said retaining device, which may consist, as shown for example, (on each side of the casting $B^3$,) of a slot $b^{11}$, in the said casting $B^3$ in which the projections $b^{10}$ (which engage in the channels $b^9$ in the mast, or leader, $b$,) engage, can be adjusted in position in accordance with the direction in which the pile-driver proper is to operate—that is to say, whether it is to operate vertically, or at any desired angle, or "batter". Each of the said projections $b^{10}$, is provided with a locking-pin $b^{12}$, which can be moved inward to engage with one, or other, of a series of holes $b^{13}$, $b^{13}$, along the mast, or leader, $b$, according to the positions which the pile-driving apparatus proper is to take during work.

The head, or nose-end, of the forward portion A, of the structure, which holds the mast, or leader, $b$, in the position for work, can be arranged to be movable, in a horizontal plane, through such a number of degrees that a pile can be driven with its face at any angle and its axis at any "batter".

The rearward portion C, of the structure carries winding gear, such for instance, as winches $c^1$, $c^2$, either of which can be driven separately through suitable clutch mechanism, from an engine, for instance a steam engine, supplied with steam by a boiler $c^3$, or an electric motor, which engine can be carried by the said rearward portion. One of the said winches is for a rope, or chain, $j$, connected with the jumper $B^2$ and used as aforesaid in conjunction with the rope, or chain, $f$, for manipulating the mast, or leader, $b$, in bringing it into position, either for traveling, or for use, and for raising, or lowering, the jumper $B^2$, when the mast, or leader, is in its working position; and the other winch is for the rope, or chain, $i$, guided by pulleys as illustrated, for manipulating the piles against the mast, or leader, $b$, for bringing them into position for driving, or for other purposes; the rope, or chain, $i$, then being attached to the mast, or leader, at any convenient place, so as not to interfere with the working of the jumper $B^2$.

For joining the forward and rearward portions A and C, of the structure together any suitable fastenings may be used, but it is preferred to use transverse ribs, or stepped parts, $k$, (see Figs. 13 to 16) at, or near, the opposed ends of the respective portions A and C of the structure, and to embrace these ribs, or stepped parts, by means of correspondingly grooved securing-plates $l$, which embrace the said ribs, or stepped parts, $k$, and hold, or assist in holding, the said portions of the structure firmly together, the said ribs, or stepped, parts, very efficiently taking the tensile stress. The said plates $l$, when in position, can be secured by bolts as indicated at $l^2$. The lower, or other suitable parts, of the said opposed ends of the said forward and rearward portions A and C of the structure can be provided with projections as indicated at $m$, and recesses, or openings, as indicated at $n$, which engage together when the said portions A and C, are in correct position for joining and the said portions can also be connected by devices, such as bolts, at $p$, which take shearing stress.

The bogies $D^1$, $D^2$, which carry the forward portion A, of the structure can be provided with screw-jacks (which may, if desired, form permanent parts of the bogies) by which, when the structure is to be brought to position for work, the forward portion A, can be raised on its bogies to the position for connection to the rearward portion C, and, when this connection is securely made, the said bogies $D^1$, $D^2$, can be run from underneath the portion A, upon side branch lines for example, and the whole structure can then be run forward, upon the bogies $D^3$, $D^4$, into position for pile-driving as shown in Fig. 3, or, if preferred, the forward portion A, can travel at a proper level for joining up to the portion C, and, after fastening the portions together, the screws of the jacks can be slacked back to allow the bogies to be removed.

In order to enable the apparatus to be used in up and down stream pile-driving, that is to say, for driving piles in different positions, laterally of the apparatus, the rearward portion C, of the structure is made in parts $C^2$, and $C^3$, articulated together at $C^4$, the forward of these parts, namely the part $C^2$, when the forward portion A, of the structure, is connected to the rearward portion C, of the structure, at E, as hereinbefore described, forming virtually a part of the said forward portion A, of the structure and turning with it upon the pivot (at $d$) of the forward bogie $D^3$, of the rearward portion C, of the structure. Means are provided (preferably rack-and-pinion gear, not shown, worked from the engine, or motor,) by which movement upon this pivot, at $d$, can be effected for bringing the head of the forward portion A, into different positions laterally for up and down stream pile-driving. Means can be provided by which an extension of these lateral up and down stream movements can be effected. This can be done by making the hinder part $C^3$ of the rearward portion C of the structure capable of being traversed laterally on the rear bogie $D^4$, by gearing which can be operated by the engine, or motor. A mode of accomplishing this is shown in Figs. 17 and 18. The under part of the part $C^3$, of the rearward portion C of the structure has the side parts $u$, and the plate and supports $u^2$, connected with it and the bolster of the bogie carries the guideways $w$, and a screw $w^2$. The plate and supports $u^2$, carry brackets embracing a screw nut $w^3$, which has a periphery toothed to constitute a worm-wheel with which engages a worm $w^4$, so that, when this is rotated from the engine, or motor, the rear end of the part $C^3$, of the rearward portion C, of the structure will be moved laterally in one, or the other, direction.

Any additional counterweight, or counterweights, may be provided in, or on, the rearward portion C of the structure which counterweight, or counterweights, may be necessary to give proper rigidity for the forward portion A—for instance, additional counterweights $q$ can be situated on either side of the aforesaid articulation (as indicated in Figs. 1 and 2) and a counterweight may be arranged so that it is kept near, or toward, the center of the track when the part $C^3$ is moved laterally. For example a counterweight $r$ (see Figs. 17 and 18), may be supported on runners $r^1$, carried by runways, $r^2$ secured to the underside of the part $C^3$, in proximity to the rear bogie $D^4$, the bolster of which bogie carries an arm $d^2$, which, at its forward end $d^3$, engages with the said counterweight $r$, as shown, and holds it in position while the part $C^3$, is moved sidewise.

Any suitable arrangements (such as springs, or dashpots) can be used for preventing injury by sudden shocks, or strains, during work, and steam pipes, or other parts, which have to pass the points of oscillation, or movement, can be formed with universal or other, joints, so that they will adapt themselves to the movements of the parts or, in some cases, flexible pipes, or connections, such for example as those shown at $s$, can be used for this purpose.

The apparatus should, of course, be arranged so that it is adapted to travel on the particular railway, track, or road, (or any such ways) over which it has to pass to the place where it is to work. Ropes, or chains, can be provided and be manipulated by a hauling device, such as a winch, or winches, on the rearward portion C, or other, part, of the structure, the said ropes, or chains, running over guide-pulleys to the head of the forward portion A for manipulating the piles, or for other purpose.

The bogies, $D^3$, $D^4$ (or only the bogie $D^3$), of the rearward portion C, of the structure can be provided with stops to prevent the springs from being overloaded and to secure rigidity when the apparatus is at work.

The hinder bogie $D^4$, of the rearward portion C, of the structure can be provided with bridles (as shown at $t$ in Fig. 17) which pass under the axle-boxes $y$, at each side of the bogie, and can be tightened up by nuts $t^2$, working on screw rods $t^3$, connected by hinge joints at $t^4$, to these bridles $t$, and thereby effect the lifting of the head, or nose-end, of the forward portion A, of the structure to allow of the removal of the bogies $D^1$ and $D^2$ and also secure further rigidity by bringing the rearward portion C, down and overcoming the resiliency of the bogie springs $z$.

Scales, with pointers, can, if desired, be provided in connection with any of the aforesaid moving parts to indicate, without other measurement, the position of the pile being driven.

The whole plant may be constructed, and arranged so that no lifting, or other, tackle, other than that carried by the structure itself, is required to erect and work the plant.

From the foregoing description it will be understood that a similar structure can be applied in analogous cases of apparatus for other purposes than pile-driving, the structure being provided with the particular appliances, or implements, suited for the purpose for which the apparatus is to be used.

The construction, or arrangement, shown in Figs. 7 to 10, is generally like that shown in Figs. 1 to 6, and the principal parts shown are marked with the same letters of reference, but the portions A and C, are each made in separable parts, or lengths, each upon a separate bogie, or separate bogies, for traveling, as shown in Fig. 7; but such parts of the forward portion A, and of the rearward portion C, respectively are connected together, as well as the portions A and C being connected, and the bogies of the forward portion A, removed for work, as hereinbefore explained with regard to the arrangement Figs. 1 to 6.

While I have described my invention with particular reference to pile driver construction, this is but illustrative of a single type of working appliance which may be mounted on the cantaliver, and I do not limit my invention thereto. Various modifications in detail, which do not depart from what I claim as my invention, will readily occur to those skilled in the art.

I claim:—

1. Traveling apparatus comprising independent anchor and cantaliver lengths, working appliances carried by said cantaliver length, bogies on which said independent lengths are separately supported during travel, and means for readily connecting said lengths together for work and disconnecting them for travel.

2. Traveling apparatus comprising independent anchor and cantaliver lengths, working appliances carried by said cantaliver length, power devices carried by said anchor length, bogies on which said independent lengths are separately supported during travel, and means for readily connecting said lengths together for work and disconnecting them for travel.

3. Traveling apparatus comprising independent anchor and cantaliver lengths, working appliances carried by said cantaliver length, bogies on which said independent lengths are separately supported during travel, means for readily disconnecting said cantaliver length from its bogie support, and means for readily connecting said lengths together for work and disconnecting them for travel.

4. In apparatus of the type specified in claim 1, an anchor length divided into separate sections hinged together, one section of which, in working position, is connected to the cantaliver section.

5. In apparatus of the type specified in claim 1, an anchor length divided into separate sections hinged together, one section of which, in working position, is connected to the cantaliver section, independent bogies for the separate anchor length sections, and a connection between each bogie and its corresponding section such that the sections may turn on their respective bogies.

6. In apparatus of the construction specified in claim 1, means for supporting the working appliances on the top of the cantaliver length during travel.

7. In apparatus of the type specified in claim 1, means for supporting the working appliances on the top of the cantaliver length during travel, and means for swinging the working appliances from travel position to working position at the end of the cantaliver length.

8. In apparatus of the type specified in claim 1, means for supporting the working appliances on the top of the cantaliver length during travel, means for swinging the working appliances from travel position to working position at the end of the cantaliver length, and a support at the end of the cantaliver length upon which said working appliances rest by gravity in working position.

9. In apparatus of the construction specified in claim 1, means for angularly adjusting the cantaliver length with relation to the anchor length, means for adjusting the working appliances with relation to the cantaliver length, and means for fixing the parts in adjusted position.

10. In apparatus of the type specified in claim 1, an anchor length divided into separate sections hinged together, one section of which, in working position, is connected to the cantaliver section, and means for shifting one of the anchor length sections laterally for the purpose specified.

11. In apparatus of the construction specified in claim 1, a counterweight carried by the anchor length.

12. In apparatus of the construction specified in claim 1, a counterweight carried by the anchor length and operatively connected with one of the bogie bolsters.

13. In apparatus of the type specified in claim 1, an anchor length divided into separate sections hinged together, one section of which, in working position, is connected to the cantaliver section, means for shifting one of the anchor length sections laterally for the purpose specified, a counterweight associated with said laterally movable anchor length section, and means for maintaining said counterweight in central position with relation to the bolster when the anchor length section is laterally shifted.

14. In apparatus of the construction specified in claim 1, a working appliance comprising a leader or mast, and means for rotating said leader on either a vertical or inclined axis with relation to said cantaliver length.

15. In apparatus of the construction specified in claim 1, springs on the anchor length bogies, and means for nullifying their action when the apparatus is in working condition.

In testimony whereof I have signed my name to this specification in the presence of two subscribing witnesses.

HARRY JOHN FEREDAY.

Witnesses:
G. F. LYON,
L. WALTER.

Copies of this patent may be obtained for five cents each, by addressing the "Commissioner of Patents Washington, D. C."